United States Patent [19]
Taguchi et al.

[11] 3,810,228
[45] May 7, 1974

[54] PHOTOGRAPHIC ELECTRONIC SHUTTER WITH POWER SWITCH CONTROL DEVICE

[75] Inventors: Tetsuya Taguchi, Kawasaki; Mutsunobu Yazaki, Yokohama, both of Japan

[73] Assignee: Canon Kabushiki Kaisha, Tokyo, Japan

[22] Filed: Feb. 14, 1973

[21] Appl. No.: 332,486

[30] Foreign Application Priority Data
Dec. 27, 1972 Japan.................................. 47-3925

[52] U.S. Cl................ 95/53 E, 95/10 CT, 95/53 EB
[51] Int. Cl. ............................................ G03b 9/62
[58] Field of Search............. 95/10 CT, 53 E, 53 EB

[56] References Cited
UNITED STATES PATENTS
3,581,633  6/1971  Uno et al........................ 95/10 CT Primary Examiner—Samuel S. Matthews
Assistant Examiner—Russell E. Adams, Jr.
Attorney, Agent, or Firm—McGlew and Tuttle

[57] ABSTRACT

The electronic shutter is operated by a shutter operating circuit, and a battery or the like is connected in series with a power switch which is closed, responsive to winding of the film for advancing the film and opened, in response to operation of a shutter for taking a picture. A second switch is closed responsive to operation of a shutter release button, to connect the battery to the shutter operating circuit. A control circuit is energized, responsive to operation of the second switch, to close a transistorized holding circuit in parallel with the switch and including the battery and the power switch, so that the shutter operating circuit remains energized even if the shutter release button is released to open the second switch. The shutter operation circuit and the control circuit are deactivated responsive to opening of the power switch which is effected at the termination of shutter operation.

8 Claims, 6 Drawing Figures

3,810,228

PHOTOGRAPHIC ELECTRONIC SHUTTER WITH POWER SWITCH CONTROL DEVICE

DESCRIPTION OF PRIOR ART

There have been various kinds of power switch control devices which have been conventionally known and have been proposed. For example, when a release switch, in association with a shutter release button, is opened and closed and the shutter release button is pressed for shutter release, a power switch is closed to start supplying electricity to a shutter time limit circuit, and at that time the shutter release button is mechanically locked in its pressed state to retain the power switch closed. The locking of the shutter release button is released in association with the completion of the opening and closing of the shutter.

In such a system the power switch to control the supply of electricity to the electronic shutter is associated with the shutter release button, and the power switch is retained closed by the action of the release button locking mechanism. This has shortcomings in that a mechanical device, such as a locking mechanism, etc. is necessary and, at the same time, an additional releasing mechanism for automatically releasing the locking mechanism after completion of the opening and closing of the shutter is necessary, thus making the setup complicated. At the same time, it is difficult to build the components into a camera which has limited space. Further, the power switch in an ordinary electronic shutter circuit has the disadvantage that, when the power switch is opened and closed, its contacts are contaminated by the effect of a shutter actuating magnet which is connected with the shutter circuit output.

SUMMARY OF THE INVENTION

The object of the present invention is to eliminate the shortcomings of such conventional power switch control devices as mentioned above.

Another object of the present invention is to provide a photographic electronic shutter in which electricity is to supplied an electronic shutter circuit using a semiconductor switching element, having no contacts, as a power switch.

Other objects of the present invention shall become apparent by the concrete examples of the present invention which will be explained below in detail.

DESCRIPTION OF THE PREFERRED EMBODIMENTS

Figure 1:
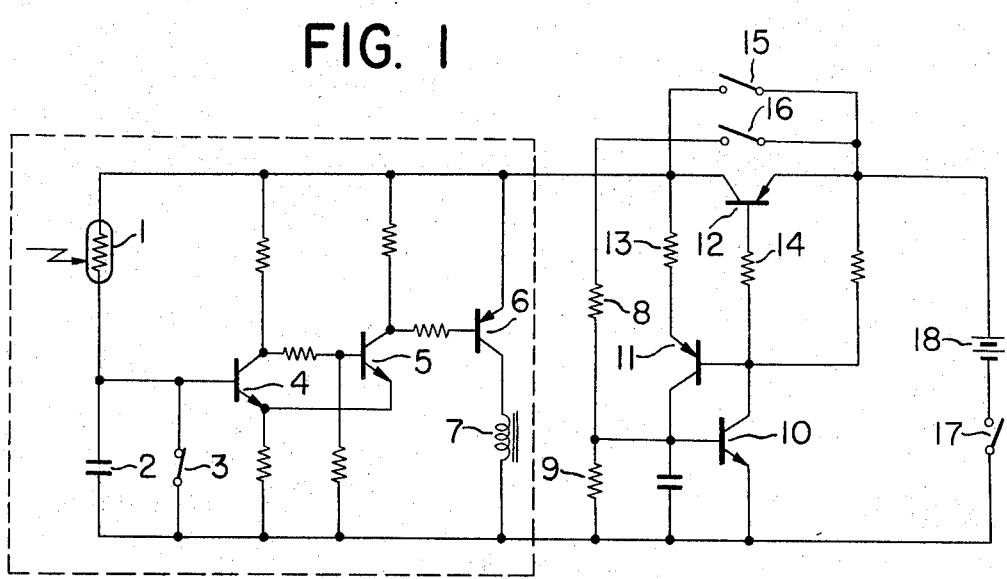
FIG. 1 is a diagram schematic of an electronic shutter control circuit to which the power switch control device according to the present invention is applied.

FIG. 1 is a circuit connection diagram showing an example of a shutter release device according to the present invention. In the drawing the portion enclosed by dotted line is an electric shutter circuit consisting of a Schmitt circuit, a photo-conductive element and a capacitor, wherein 1 is a photo-conductive element, 2 is a capacitor, 3 is a shutter starting switch, and 4, 5 and 6 are transistors in a time control circuit. 7 is an electro-magnet to actuate a shutter closing member.

Components 8 through 16 form a power source holding circuit according to the present invention, wherein 8, 9 are bleeder resistances, 10, 11 and 12 are transistors, 13, 14 are resistances, 15, 16 are switches. 17 is a power source switch and becomes ON, for example, by film wind up and becomes OFF as an exposure is completed. 18 is a power source battery. The operation of the circuit shown in FIG. 1 will now be described. Initially, power source switch 17 becomes ON responsive to film wind up to advance the film, etc. Switch 15 becomes ON responsive to a first step operation of the shutter release button, so that the time control circuit is placed in an operative state. That is, the electro-magnet 7 is excited, but as the pressing-down of the release button is released at this time the switch 15 becomes OFF and the supply of electricity to the control circuit is stopped. As the second step operation is done by further pressing down the release button, at the same time as the shutter is opened, the starting switch 3 becomes OFF, and the charging of the capacitor 2 is started through the photo-conductive element 1. The switch 16 becomes ON with the second step of release, and the voltage of the bleeder circuit comprising resistances 8, 9 is impressed on the transistor 10, so that the latter becomes ON. This results in transistor 11 becoming ON. Shutter release is memorized with the circuit consisting of transistors 10, 11 and the resistance 13. By this circuit transistor 12 becomes conductive and, even if the switches 15 and 16 become OFF, by releasing the pressing of the shutter release, as long as the memory circuit is working, electricity is supplied to the time control circuit through the transistor 12. As a certain length of time elapses from the shutter release appropriate exposure is obtained. Then transistor 4, of the control circuit, becomes ON, transistor 5 becomes OFF while transistor 6 becomes OFF so that the shutter closing member, driven by the electro-magnet 7, closes the shutter.

At the same time the power source switch 17 becomes OFF and the supply of electricity to the circuit is stopped. As explained above, since, in this device, even if the shutter button is released in the middle of exposure, the supply of electricity to the time control circuit is continued by the power source holding circuit, it is particularly advantageous for a long time exposure.

Figure 2:
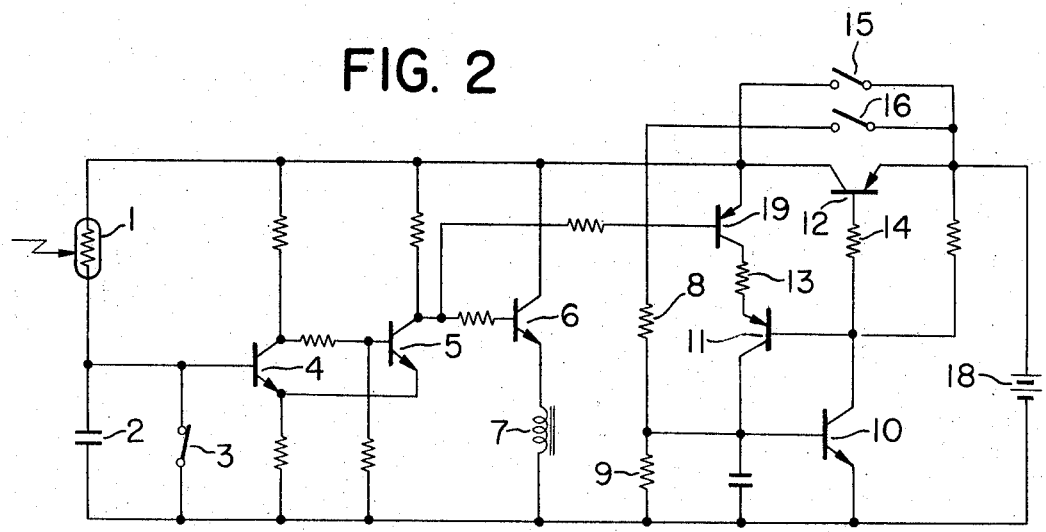
FIG. 2 is a circuit diagram of a modified electronic shutter control circuit to which the power switch control device according to the present invention is applied.

FIG. 2 shows another example of the present invention, and the power source switch 17 in FIG. 1 is automated using the transistor 19. The same elements as in the circuit shown in FIG. 1 are designated by the same numbers. While the function of this circuit will be almost the same as the example in FIG. 1, as the time control circuit is reversed after appropriate exposure is obtained, the electro-magnet 7 is actuated and the transistor 19 inserted in the memory circuit becomes OFF as the transistor 5 becomes OFF. Therefore the transistors 10, 11 in the memory circuit become OFF, and the transistor 12 becomes OFF, so that the circuit is placed in a stopped state. In this circuit, it is necessary to design the mechanism that the switch 16 becomes OFF, by shutter release, after it becomes ON by the second step operation of the release button. Since details of the other operations are the same as those of the example in FIG. 1, explanation is omitted.

Figure 3:
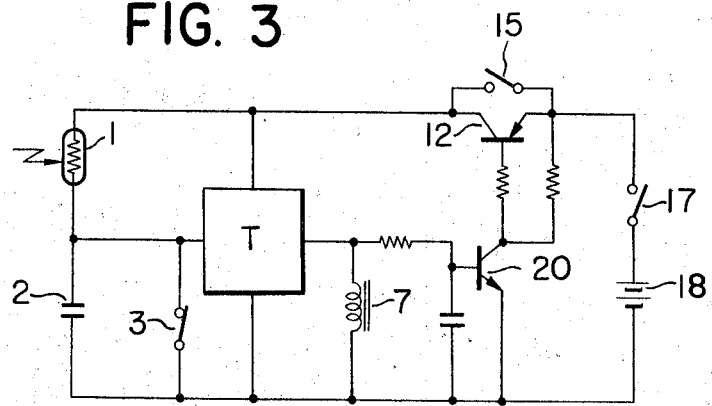
FIG. 3 is a circuit diagram of another modification of an electronic shutter control circuit to which the power switch control device according to the present invention is applied.

FIG. 3 shows the power source holding circuit in the above mentioned example in a simplified form, wherein T shows, for example, such a time control circuit as a Schmitt trigger circuit. In the drawing, the power source switch 17 becomes ON by film wind up and becomes OFF by shutter closing. This function of the circuit makes the switch 17 ON, and the switch 15 becomes ON by the first step operation of the release button. Next, when the switch 3 becomes OFF by the second step operation opening the shutter and appropriate exposure is obtained, the shutter is closed by the electromagnet 7. Since the transistor 20 continues its ON state during the shutter action, the transistor 12 is in ON state, and, even if the switch 15 becomes OFF, the supply of electricity to the control circuit is continued through the transistor 12. As the energization of the electromagnet 7 is interrupted the transistor 20 turns to OFF and the transistor 12 also becomes OFF so that the circuit will be placed in a stopped state.

Figure 4:
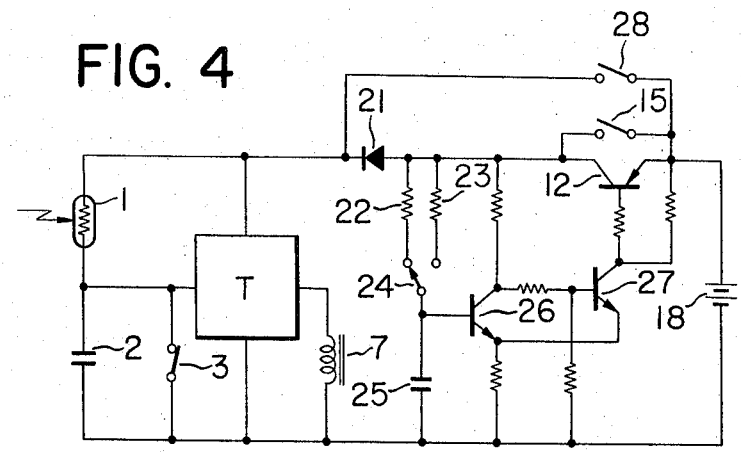
FIG. 4 to FIG. 6 show circuit diagrams of other modified electronic shutter control circuits to which the power switch control device according to the present invention is applied.
Figure 5:
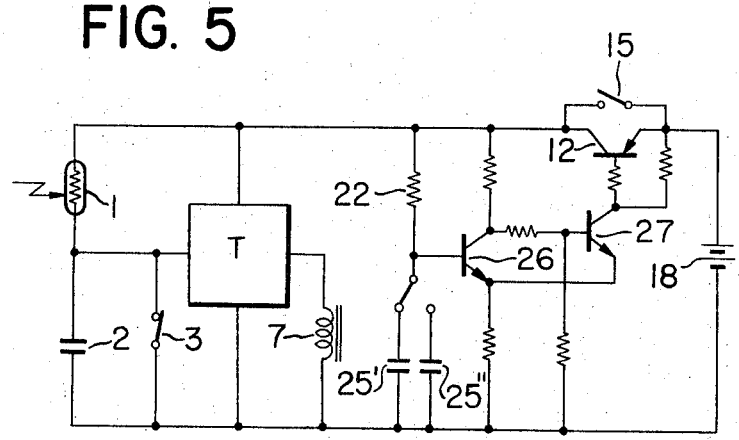

FIG. 4 and FIG. 5 are circuit connection diagrams showing other examples of the shutter release devices according to the present invention. These circuits are designed for the case when a self-timer is also used. In these circuits, second time control circuits, and their time constant change over circuits are provided. In the drawings, 21 is a diode, 22, 23 are resistances of a time constant circuit, 24 is a change over switch, 25 is a capacitor, 26, 27 are transistors of the second time control circuit, and 28 is a switch.

The operation of the circuit of FIG. 4 is such that the switch 28 becomes ON by the first step operation of the release button, and the electro-magnet 7 of the shutter circuit is excited. In this state, as the diode 21 is connected in the reverse direction electricity will not be supplied to the power source holding circuit. As the shutter is opened by the second step operation of the release button, making the switch 3 OFF and the switch 15 ON, capacitor 25 is charged through resistance 22 or resistance 23 of the timer circuit. When the timer activation time is suitably set by the change-over switch 24 for ordinary photographing or for self timer photographing, the transistor 26 of the second time control circuit turns to ON by the time constant factor of this circuit while the transistor 27 turns to OFF and, after an elapse of a predetermined length of time, the transistor 12 becomes OFF and the circuit will be placed in a stopped state. That is, the operating time of the second timer circuit should be made longer than the longest time of, in the shutter in case of ordinary photographing, while the time should be longer than the longest shutter time plus the self timer operation time, in the case of self timer photographing.

In the circuit of FIG. 5 the change over of the timer operation time is made by changing over the capacitors 25', 25'', while the other operations are the same as in the examples in FIG. 1 on, so that explanation will be omitted.

Figure 6:
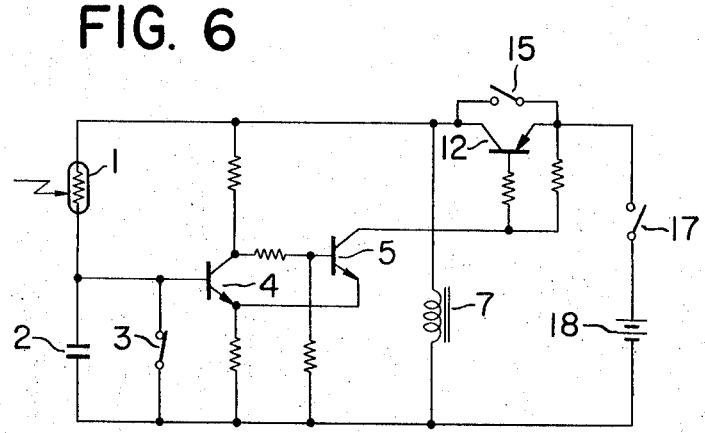

FIG. 6 is a circuit connection diagram showing an example of the present invention wherein the circuit arrangement is simplified, and the switch 15 becomes ON by the first step pressing down of the shutter release button while it becomes OFF by the second step pressing down. That is, when the switch 15 becomes ON, the transistor 4 of the time control circuit becomes OFF, and the transistor 5 becomes ON, so that the supply of electricity to the control circuit will be continued through the transistor 12 of the voltage holding circuit even if switch 15 becomes OFF. The electromagnet 7 also is excited. When the switch 3 becomes OFF and the shutter is opened, appropriate exposure is obtained, the control circuit is reversed, placing the transistor 4 ON and the transistor 5 OFF. By this the transistor 12 turns to OFF and the electromagnet 7 is deenergized, closing the shutter. As the shutter is closed, power switch 17 becomes OFF and the operation of the circuit is stopped.

As has been explained above in a camera using the shutter release device according to the present invention, even if the action of the release button is released before completion of exposure the circuit will be retained electrically in an operative state, so that complicated mechanism, as in mechanical locking devices of release buttons in various electric shutter cameras, is not necessary, and the device can be very effectively operated and has great advantages in designing a camera.

What is claimed is:

1. In a camera including shutter means movable successively to open and closed positions, to define an exposure interval, responsive to manual actuation of a shutter release member, a control network including a timing circuit and a switch circuit connected to said timing circuit, and exposure terminating means connected to said switch circuit and operable, responsive to one state of said switch circuit, to close said shutter means, the timing circuit, after a predetermined exposure time following energization thereof, causing said switch circuit to assume such one state; the improvement comprising, in combination, a source of electric potential; a source switch closed responsive to film advance following an exposure and opened responsive to completion of an exposure by said shutter means, said source switch connecting said source to one terminal of said control network; a first normally open switch means connecting said source to the other terminal of said control network; a manually actuable shutter release member operable, when actuated, to open said shutter means and to close said first switch means to energize said network, and operable, when manually released, to open said first switch means; a switching transistor connected in parallel with said first switch means; and a holding circuit, including said source switch, triggering said switching transistor conductive responsive to closing of said first switch means to maintain energization of said control network irrespective of whether said shutter release member is maintained manually actuated, said holding circuit maintaining said switching transistor conductive for a period in excess of the maximum shutter operating time and, during at least shutter opening and closing, irrespective of the state of said switch circuit.

2. In a camera, the improvement claimed in claim 1, in which the collector-emitter circuit of said switching transistor is connected in parallel with said first switch means; said holding circuit including a second transistor having its collector-emitter circuit connected in controlling relation to the base of said switching transistor; and means operable, responsive to closing of said first switch means, to apply a voltage to the base of said second transistor to trigger said second transistor conductive.

3. In a camera, the improvement claimed in claim 2, in which said last named means comprises a voltage divider connected to the base of said second transistor and connected across said source responsive to closing of said first switch means.

4. In a camera, the improvement claimed in claim 2, including a third transistor connected to said second transistor and triggered conductive responsive to conduction of said second transistor; said source switch comprising a fourth transistor having an output circuit connected in series with said second transistor and with said switching transistor, and having its base connected to said timing circuit; said fourth transistor being triggered non-conductive responsive to said timing circuit controlling said switch circuit to said one state.

5. In a camera, the improvement claimed in claim 2, in which the base of said second transistor is connected to said switch circuit with said second transistor being triggered non-conductive responsive to said switch circuit assuming said one state in which said exposure terminating means closes said shutter means.

6. In a camera, the improvement claimed in claim 1, in which the collector-emitter circuit of said switching transistor is connected in parallel with said first switch means; a transistorized timing circuit having an output collector-emitter circuit connected to the base of said switching transistor; and an RC circuit connected to an input base of said transistorized timing circuit and connected across said source responsive to actuation of said first switch means; one of the R and C members of said RC circuit being selectively adjustable to select the time constant of said transistorized timing circuit.

7. In a camera, the improvement claimed in claim 6, in which the R member of said RC circuit is adjustable.

8. In a camera, the improvement claimed in claim 6, in which the C member of said RC circuit is adjustable.

* * * * *